(12) United States Patent
Gopalakrishnan et al.

(10) Patent No.: US 12,047,231 B2
(45) Date of Patent: Jul. 23, 2024

(54) METHOD FOR CONFIGURING AN INTELLIGENT ELECTRONIC DEVICE

(71) Applicant: ABB Schweiz AG, Baden (CH)

(72) Inventors: Abhilash Gopalakrishnan, Bengaluru (IN); Jithin Kizhakey Putanvetil, Kerala (IN); Martin Nykvist, Singsby (FI); Jithin M, Kerala (IN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/719,830

(22) Filed: Apr. 13, 2022

(65) Prior Publication Data

US 2022/0239557 A1 Jul. 28, 2022

Related U.S. Application Data

(63) Continuation of application No. PCT/IB2020/060415, filed on Nov. 5, 2020.

(30) Foreign Application Priority Data

Oct. 16, 2019 (IN) .............................. 201941041868

(51) Int. Cl.
*H04L 41/0806* (2022.01)
*H04L 41/08* (2022.01)
(Continued)

(52) U.S. Cl.
CPC .......... *H04L 41/0806* (2013.01); *H04L 41/08* (2013.01); *H04L 41/16* (2013.01); *H04L 67/34* (2013.01)

(58) Field of Classification Search
CPC . H04L 41/0803; H04L 41/08; H04L 41/0866; H04L 41/084; H04L 41/16; H04L 41/0806; H04L 41/145
See application file for complete search history.

(56) References Cited

U.S. PATENT DOCUMENTS 8,942,970 B2  1/2015 Kumar et al.
10,339,919 B1 * 7/2019 Raux .................... G10L 15/063
(Continued)

FOREIGN PATENT DOCUMENTS

EP        2391089 A1  11/2011
WO   WO 2019/130165 A1   7/2019

OTHER PUBLICATIONS

European Patent Office, International Search Report in International Patent Application No. PCT/IB2020/060415, 4 pp. (Jan. 18, 2021).
(Continued)

*Primary Examiner* — Tonia L Dollinger
*Assistant Examiner* — Linh T. Nguyen
(74) *Attorney, Agent, or Firm* — Leydig, Voit & Mayer, Ltd.

(57) ABSTRACT

A system and method for configuring an intelligent electronic device (IED) from a plurality of IEDs connected in a communication network of a substation with a computing system includes a computing system communicatively connected in the communication network of the substation for transmitting a configuration of at least one application function to the IED for operating an electrical equipment in the substation. The method for configuring the IED comprises using a virtual model of the IED to generate the IED configurations through a simulation that involves a sequence prediction technique. The sequence prediction technique facilitates generating a sequence of functions arranged in an order and sequentially determining connections between at least one input and at least one output of the one or more functions that comprises the application function. The generated sequence of functions and sequence of connections constitute the IED configuration corresponding to a given application function.

6 Claims, 9 Drawing Sheets

Figure 1:
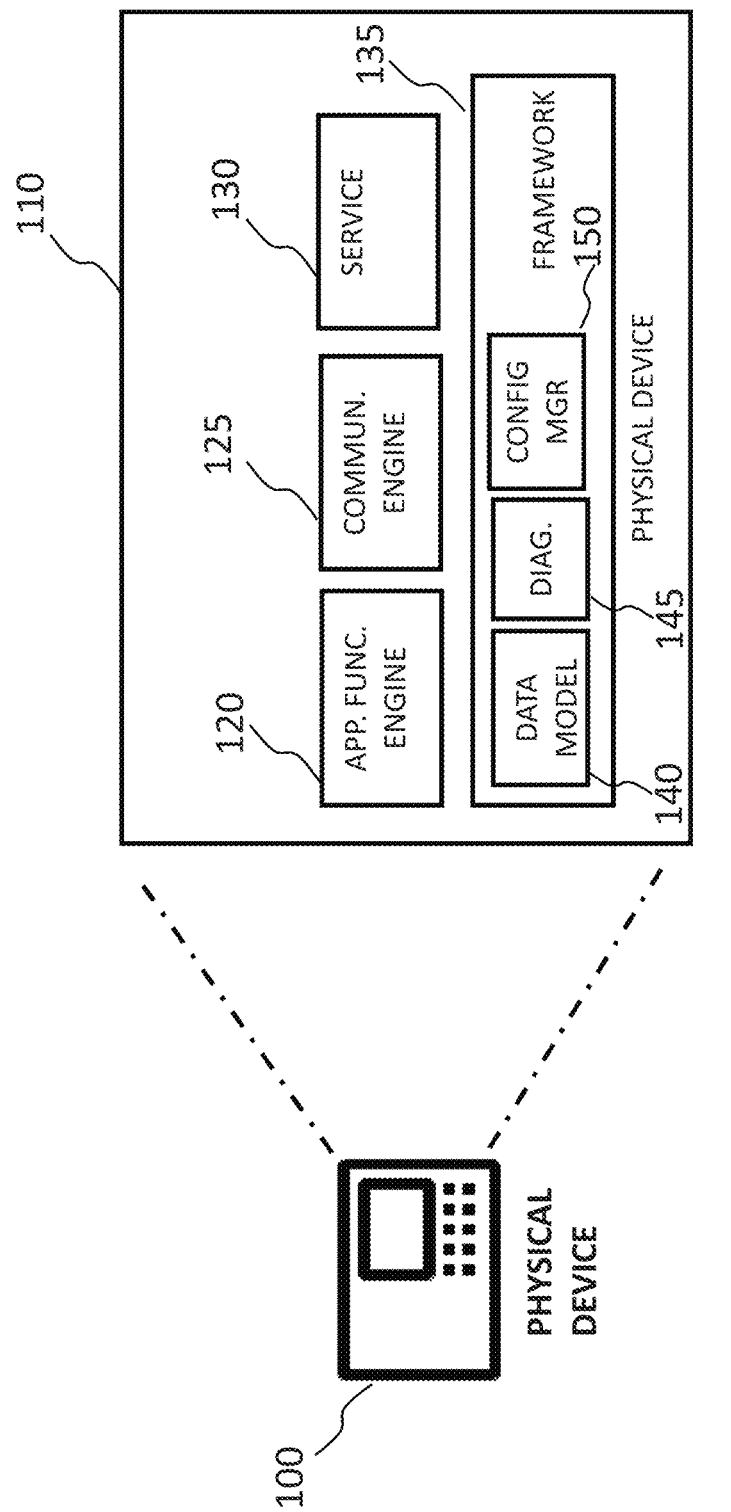

(51) Int. Cl.
*H04L 41/16* (2022.01)
*H04L 67/00* (2022.01)

(56) References Cited

U.S. PATENT DOCUMENTS

| | | | |
|---|---|---|---|
| 10,605,470 B1* | 3/2020 | Saxena | H04L 67/10 |
| 2006/0116794 A1 | 6/2006 | Stoupis et al. | |
| 2011/0202549 A1* | 8/2011 | Nagahori | G06F 3/067 |
| | | | 707/769 |
| 2012/0022713 A1* | 1/2012 | Deaver, Sr. | G05B 17/02 |
| | | | 700/298 |
| 2012/0239320 A1 | 9/2012 | Frei et al. | |
| 2013/0010322 A1* | 1/2013 | Sato | H04L 67/34 |
| | | | 358/1.14 |
| 2013/0124529 A1* | 5/2013 | Jacob | G06F 9/44505 |
| | | | 707/E17.089 |
| 2013/0211546 A1* | 8/2013 | Lawson | H04L 67/02 |
| | | | 700/9 |
| 2013/0235407 A1* | 9/2013 | Kobayashi | H04N 1/00973 |
| | | | 358/1.13 |
| 2014/0156337 A1* | 6/2014 | Pechanec | G06Q 10/06 |
| | | | 705/7.27 |
| 2015/0294037 A1* | 10/2015 | Caird | G06F 30/13 |
| | | | 703/1 |
| 2016/0006476 A1* | 1/2016 | El-Rayis | H04B 1/48 |
| | | | 455/78 |
| 2016/0292548 A1* | 10/2016 | Nguyenvan | H04N 1/2338 |
| 2018/0314780 A1* | 11/2018 | Bertilsson | G06F 8/20 |
| 2019/0347143 A1* | 11/2019 | Carteri | G06F 11/3433 |
| 2019/0377306 A1* | 12/2019 | Harvey | G05B 13/027 |
| 2020/0110617 A1* | 4/2020 | Chaganti | G06F 9/4406 |
| 2020/0411168 A1* | 12/2020 | Thomas | G06Q 10/06311 |
| 2021/0370980 A1* | 12/2021 | Ramamoorthy | G06F 18/214 |

OTHER PUBLICATIONS

European Patent Office, Written Opinion in International Patent Application No. PCT/IB2020/060415, 9 pp. (Jan. 18, 2021).

Intellectual Property India, First Examination Report in Indian Patent Application No. 201941041868, 6 pp. (Apr. 27, 2021).

* cited by examiner

METHOD FOR CONFIGURING AN INTELLIGENT ELECTRONIC DEVICE

CROSS-REFERENCE TO RELATED APPLICATIONS

This patent application claims the benefit of International Patent Application No. PCT/M2020/060415, filed on Nov. 5, 2020, which claims priority to Indian Patent Application No. 201941041868, filed on Oct. 16, 2019, both of which are incorporated herein in their entirety by reference.

FIELD OF THE DISCLOSURE

The present disclosure relates to an Intelligent Electronic Device (IED) of a substation automation system and, more specifically, to generating a configuration of the IED for power system protection, control and automation functions.

BACKGROUND OF THE INVENTION

Substation automation comprises the monitoring, control, protection, and/or metering of various primary equipment in the substation. The primary equipment could be electrical generators, electrical motors, power transformers, transmission and distribution lines, circuit breakers, capacitor banks, etc.

The substation automation is performed typically using intelligent electronic devices (IEDs) that generally receive electric power system information from primary equipment, make decisions (e.g. trip decision to isolate and protect an electrical equipment) based on the information, and provide monitoring, control, protection, and/or automation functions.

Different IEDs are typically configured to accomplish different application functions, where the application functions could be one of monitoring, protection, control, etc. IEDs can also be configured to perform generic multi-functions that is combination of the above-mentioned application functions including recording function of electrical events.

In a multi-function relays (IEDs), there are many possible configurations. Generally, relays (IEDs) are configured by engineers for customer goals (application functions for the IEDs) as predefined combinations of configurations in a test phase and these predefined configurations are available as templates for pre-configurations.

Currently, there can be limited means of validating the IED configurations (e.g. based on order code or based on identifying engineering approach or usage of IED).

Multi-functional IEDs are devices hosting multiple applications. It is typical of a IED user/customer/engineer to want to expand the functionality of the IED or even change the functionality of the IED over a period of time after the IED has been installed. This expanding of functionalities for IEDs by engineering additional functionality or changing the IED functionality requires engineering IED configurations and providing the updated configuration to the IED.

For most power system relays, engineering (IED configuration) is typically done using offline tools and then when the hardware arrives the configuration is provided to the IED Many cases the offline engineering might not match with real hardware leading to additional effort spent on making these corrections. The engineered configurations may not conform to the given model or firmware version of the IED. The engineered configurations or pre-configurations may have one or more invalid configurations or sub-configurations that may not be evident until after a fault or warning during the IED operations brings forth the invalid segments of the configurations.

It is therefore an object of the invention to avoid the difficulties arising from the above mentioned sources of error or inconsistency. This objective is achieved by a method that provides early access to customers/engineers, a cloud based digital twin (virtual model) of the IEDs for engineering the IEDs for a wide range of application functions. The engineering of the IEDs is performed through generating automated configurations of the IEDs based on the defined application for the IEDs Another embodiment of the invention allows for guided-engineering of the IEDs through a step-wise recommendation of the IED configurations.

BRIEF SUMMARY OF THE INVENTION

The above-mentioned shortcomings, disadvantages and problems are addressed herein which will be understood by reading and understanding the following specification.

The present invention provides a method for engineering an IED through generating the IED configurations on a computing system that could be in the cloud (a cloud computing system) or/and in an edge computing platform. The IED configurations generated on the edge or/and the cloud computing system are transmitted onto the physical IED enabling the physical IED to perform the application function corresponding to the IED configuration.

The cloud computing system is provided with a virtual model of the physical IED and is configured to be its digital twin. The generated IED configurations corresponds to one or more application functions of the physical IED. The application function for the IED is typically identified or defined by a customer or an engineer. Examples of the IED application functions could involve performing a function of monitoring, control, metering, etc. of a primary equipment of the substation or an entire bay of the substation.

The configurations corresponding to an IED application function are generated either in an automated mechanism or through a guided-engineering mechanism. In the automated mechanism of generating the IED configurations, a sequence prediction machine learning algorithm (also referred to herein as sequence prediction technique) hosted on the cloud computing system first identifies application functions required of the IED and looks through a database of configurations historically saved and hosted on the cloud computing system to perform a similarity search. This similarity search reveals any configurations that are similar between the requested IED configuration and the historically saved IED configurations. The identified similar IED configurations forms the basis for generating configurations that need to be generated to meet the customer/engineer definition.

The sequence prediction machine learning algorithm (sequence prediction technique) also identifies the customer/engineer profile that has requested for the specific IED application function. Nature of the customer/engineer profile includes obtaining all historically available IED configurations used by the customer/engineer or/and the historical IED configurations preferred by the customer/engineer. This is referred to herein as collaborative filtering and can be performed using either a dedicated collaborative filtering algorithm or the sequence prediction technique. The sequence prediction machine learning algorithm is trained on the such collection of historical data that contains both customer/engineer specific preferences of IED configuration (collaborative filtering) and other typical configurations historically used by various IED as their respective application functions. The sequence prediction machine learning algorithm (sequence prediction technique) then generates the final IED configurations corresponding to the application function as requested by the customer/engineer. The IED configurations are generated as a sequence of functions where the sequence prediction machine learning algorithm (sequence prediction technique) also assigns the sequence of input/output signal connections of the functions in the sequence. This sequence of functions and assigning of the sequence of their input/output signal connections can be automatically generated by the sequence prediction machine learning algorithm—this constitutes automated generation of IED configurations corresponding to the required IED application functions. In another embodiment of the invention, the sequence prediction machine learning algorithm recommends the sequence of functions and also assigning of the sequence of their input/output signal connections where output of a previous function forms input to a next function. The finally generated IED configuration can be verified on the cloud computing system by implementing the generated IED configurations as the digital twin of the IEDs Various test scenarios can be verified on the cloud computing system before deploying the final IED configuration to the physical IED.

BRIEF DESCRIPTION OF THE SEVERAL VIEWS OF THE DRAWING(S)

Figure 2A:
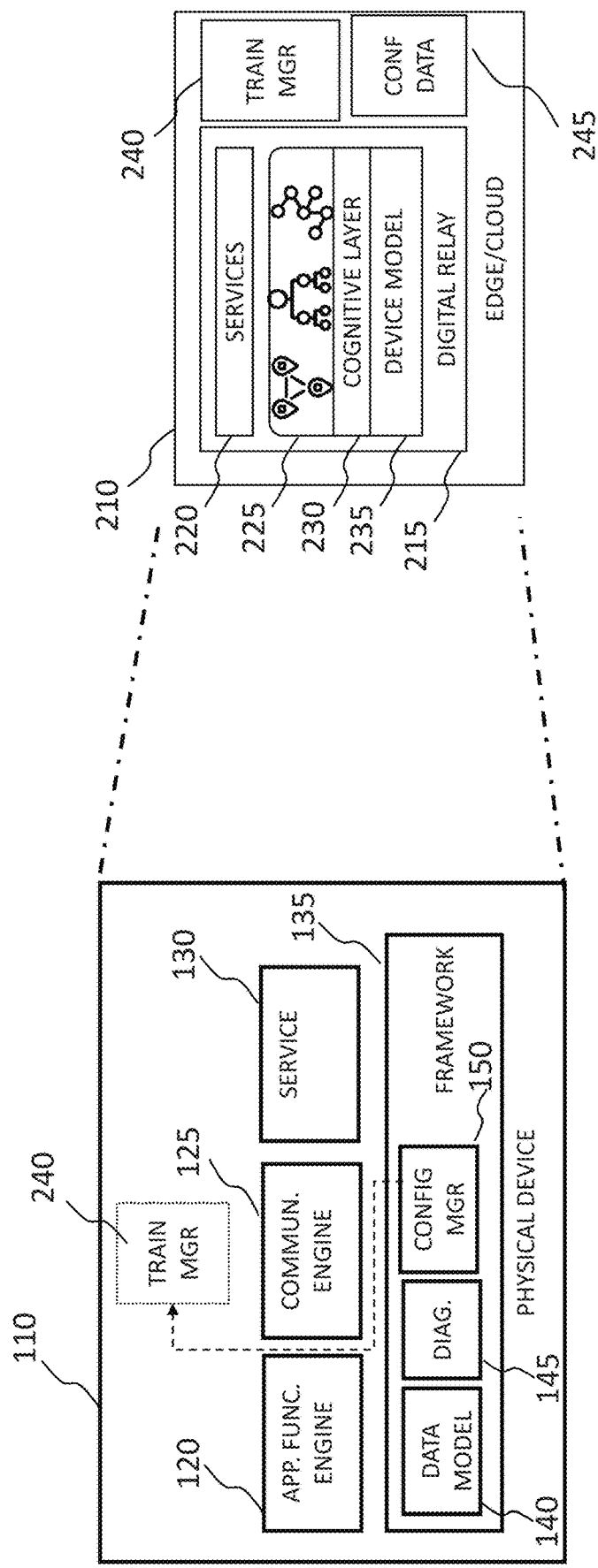
Figure 2B:
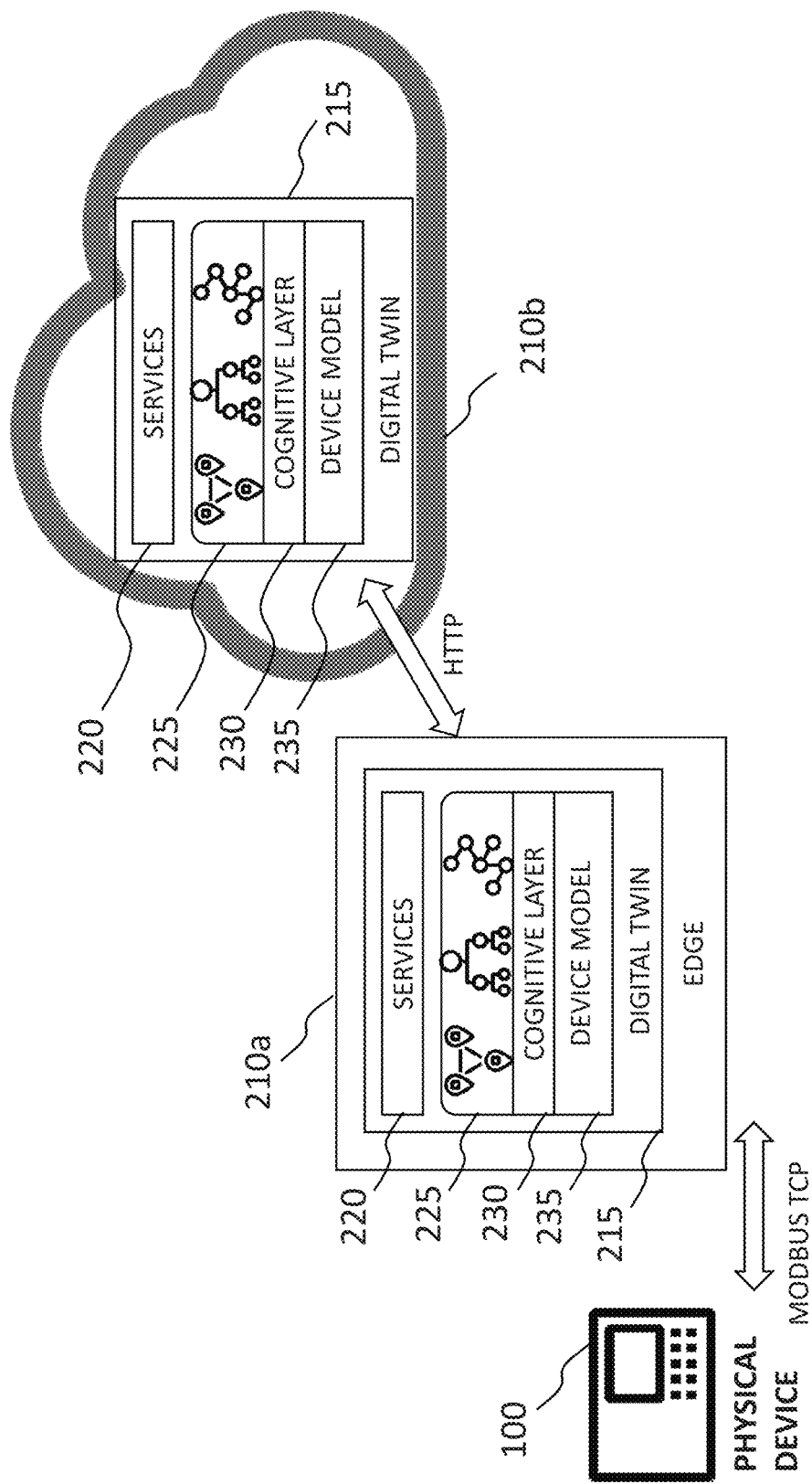
Figure 3:
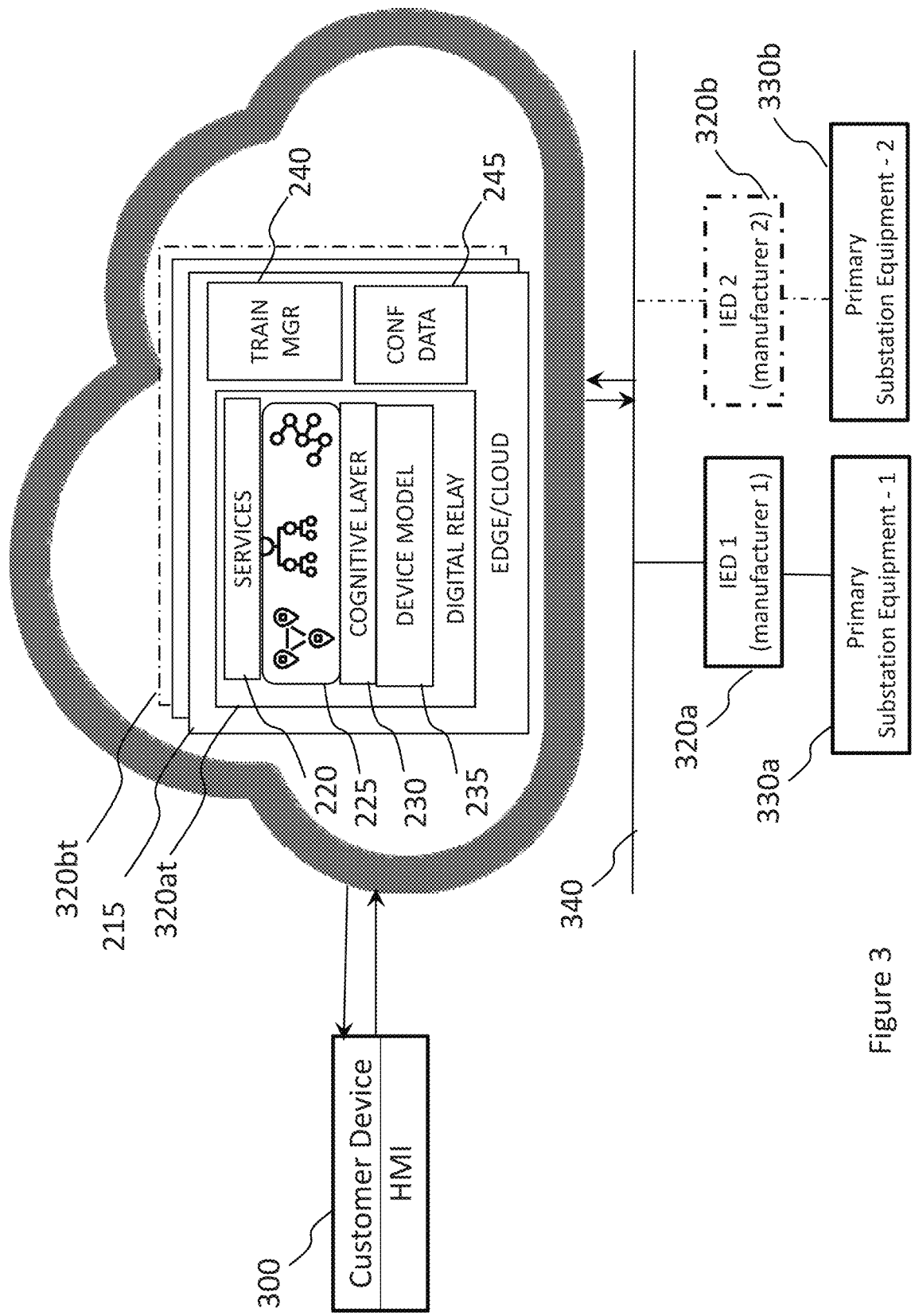
Figure 4:
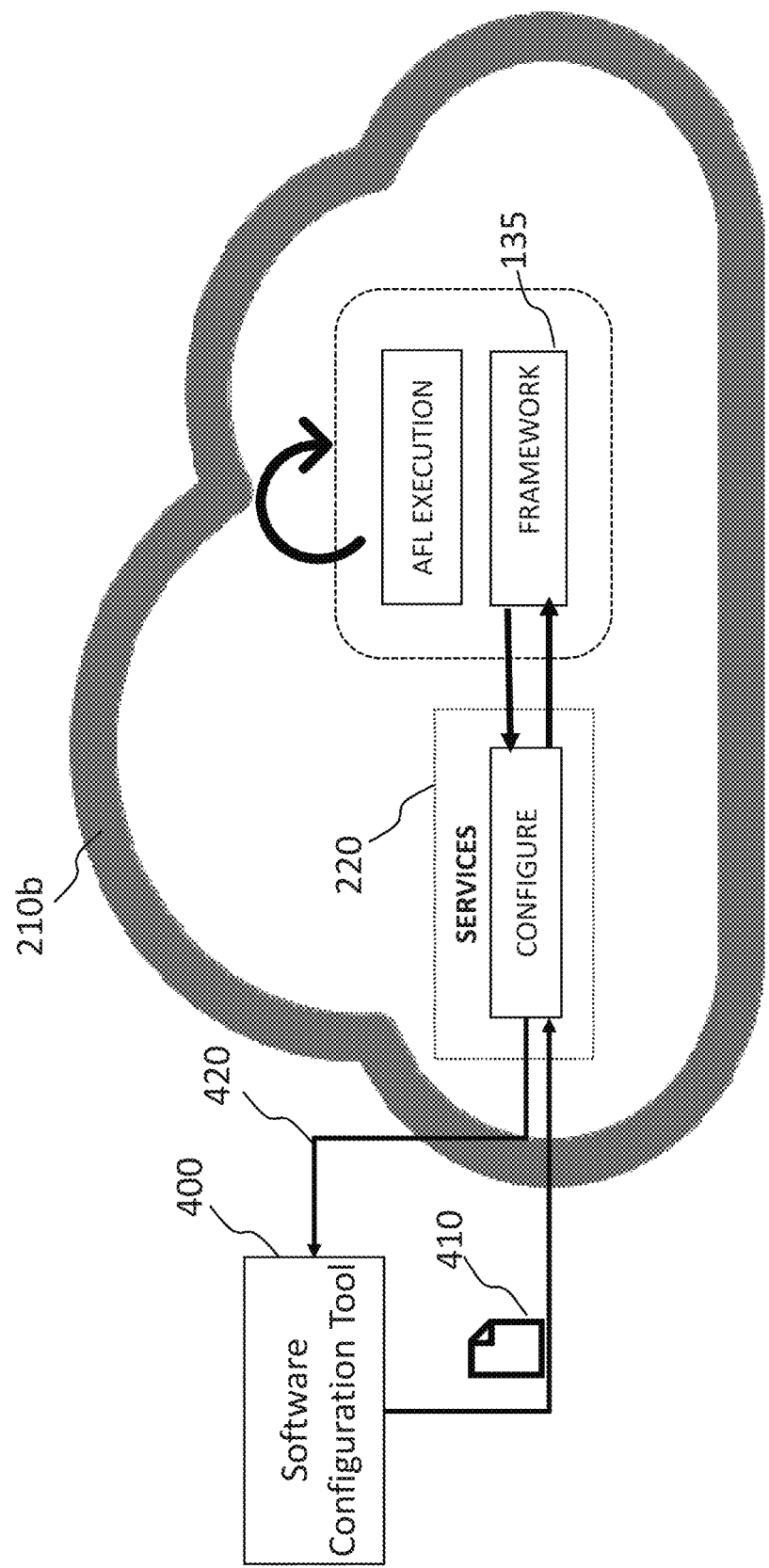
Figure 5:
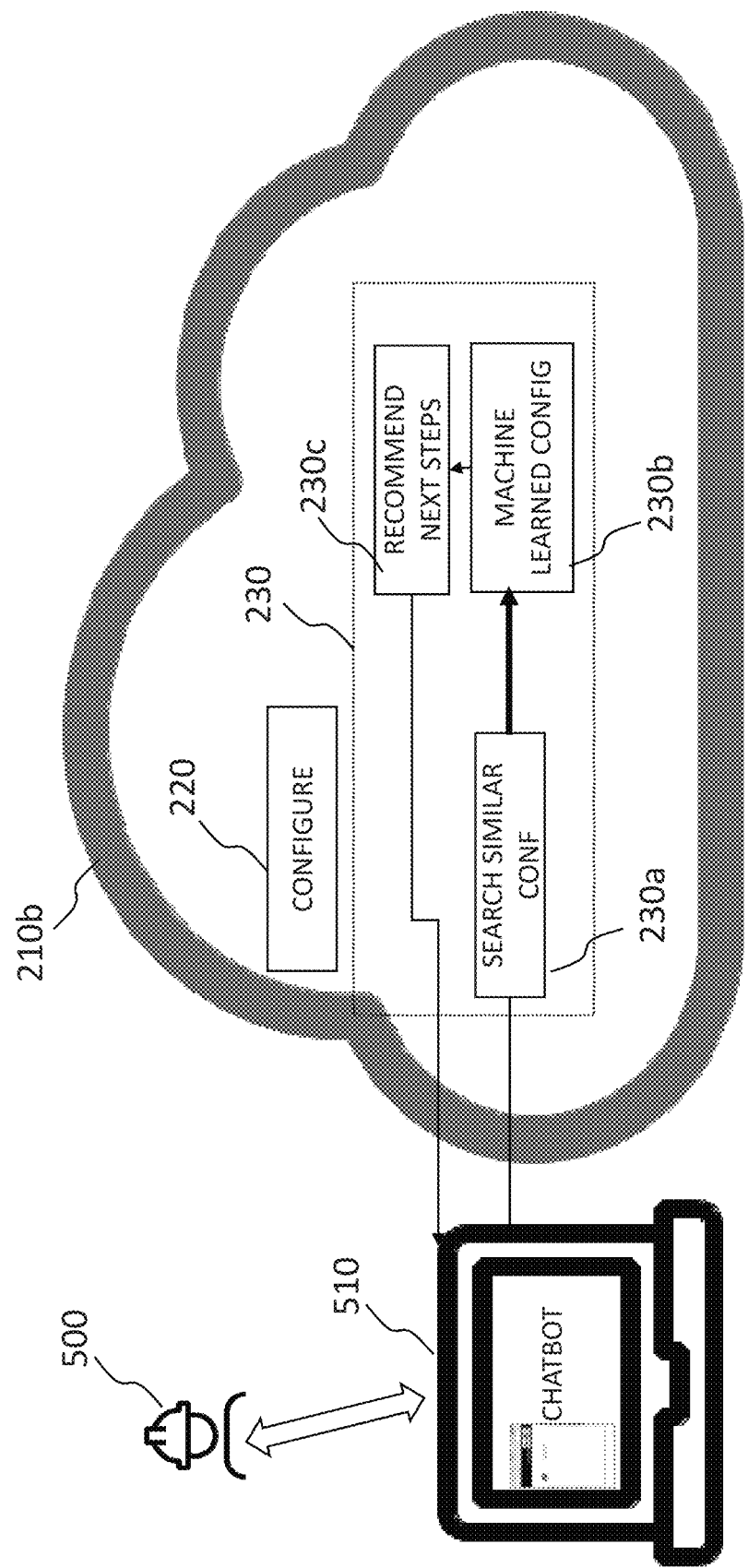
Figure 6:
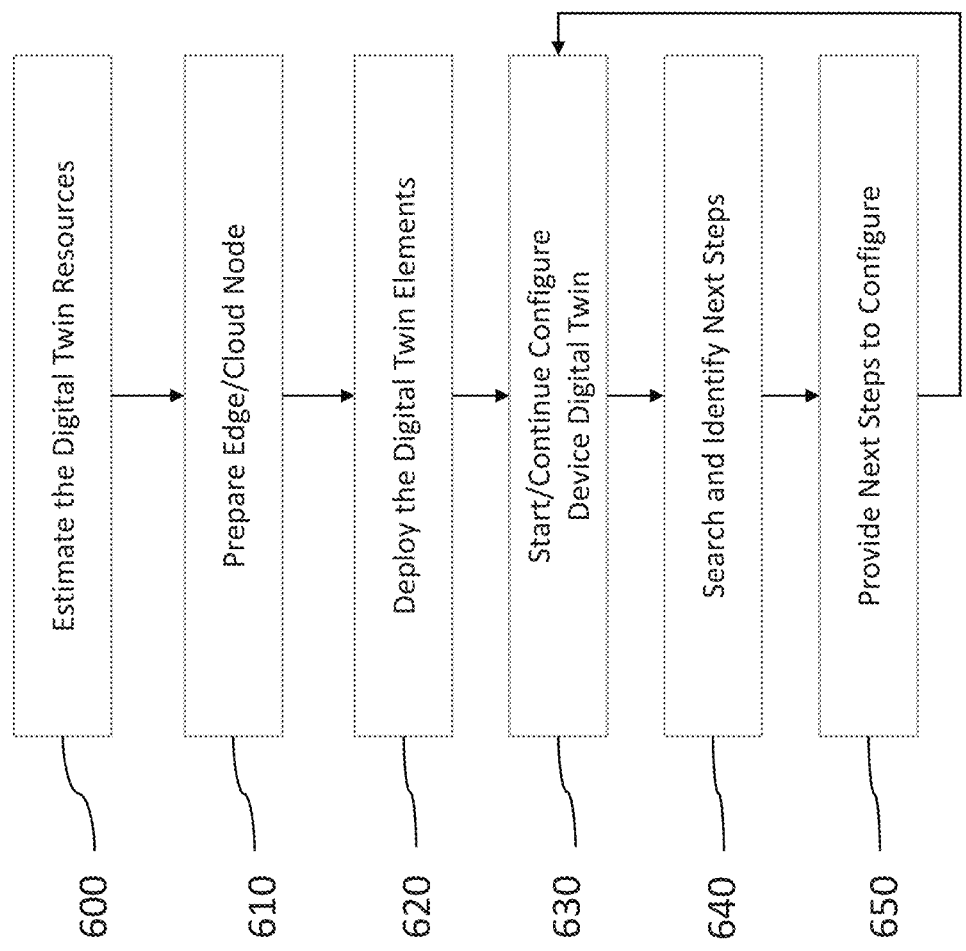
Figure 7:
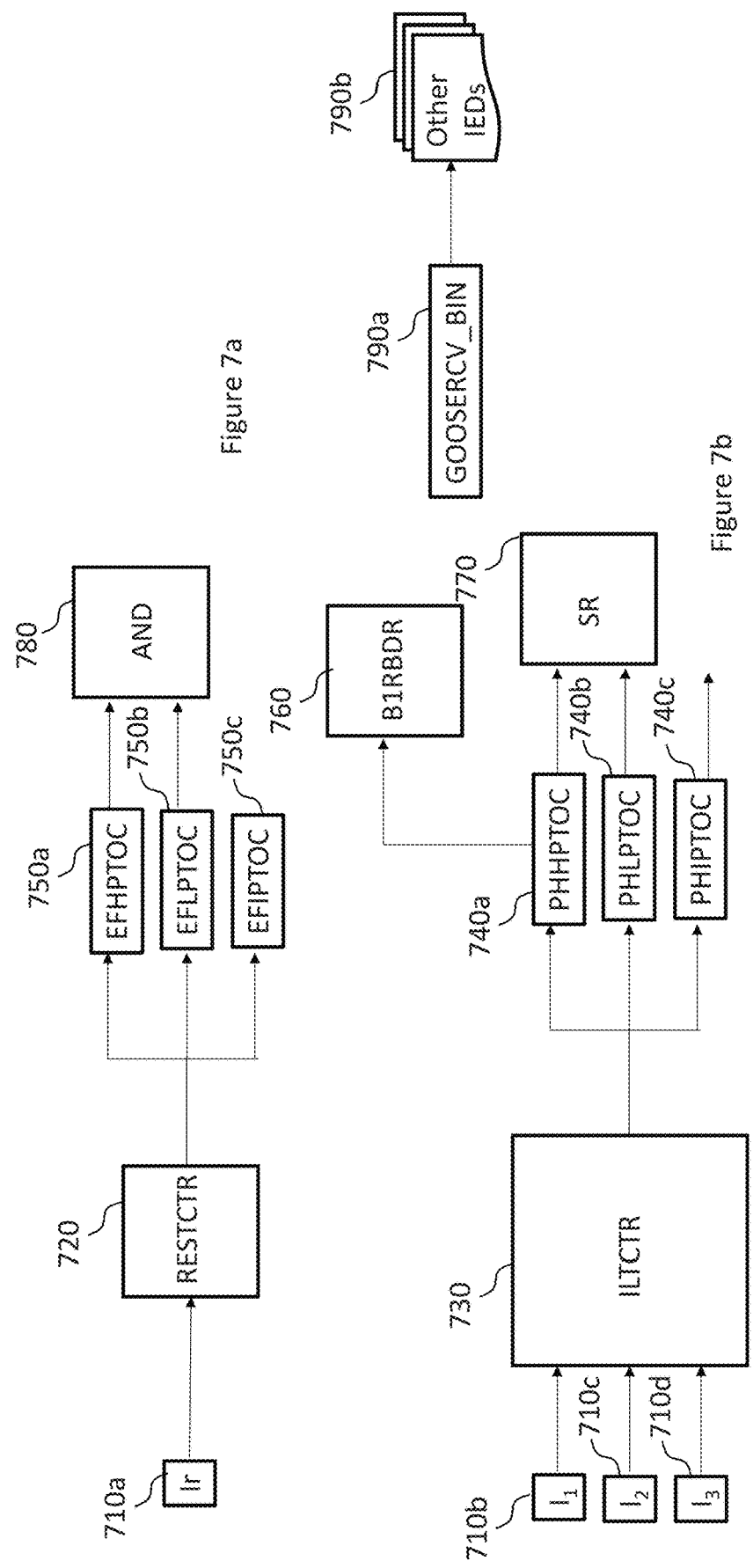
Figure 8:
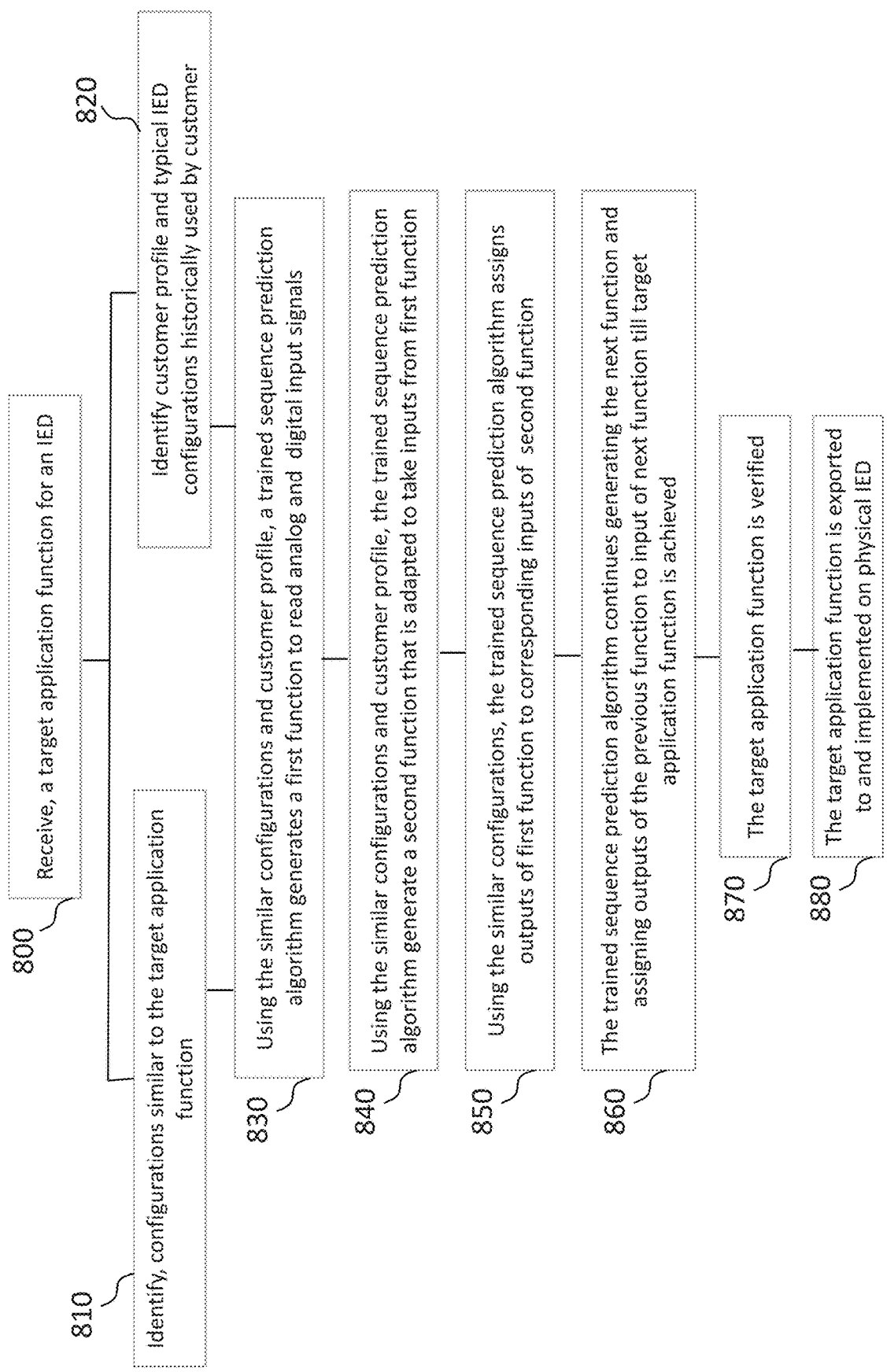

The appended drawings illustrate exemplary embodiments as disclosed herein and are not to be considered limiting in scope. In the drawings:

FIG. 1: A physical device such as an IED and its functional representation;

FIG. 2a: The functional representation of the physical device (such as IED) along with its alternate representation;

FIG. 2b: The functional representation of the physical device implemented as a digital twin on the edge and cloud;

FIG. 3: The complete system representation showing the critical components and the interaction between the various system components;

FIG. 4: Representation of the primary elements involved in automated generation of the IED configurations as a sequence of functions and assigning of the input/output signals of sequence of functions;

FIG. 5: Representation of the primary elements involved in generation of the IED configurations through a guided-engineering mechanism of generating the sequence of functions and assigning of the input/output signals of sequence of functions;

FIG. 6: A summary of the method that represents generating IED configurations on the edge or cloud computing system;

FIGS. 7a and 7b: A representation of the IED configurations generated as a sequence of functions and assigning of a function input/output signal. The IED application function is for power system fault analysis and trip trigger based on automated or guided-engineering of IED configurations using trained sequential prediction algorithm for sequence prediction of functions and sequence prediction of function input/output signal connection; and FIG. 8: A summary of the method that represents generating IED configurations on the edge or cloud computing system.

DETAILED DESCRIPTION OF THE INVENTION

Substation Automation (SA) systems include several basic SA functions for protection, control and monitoring of the substation. The automation functions can relate to either the individual constituents of primary equipment or to entire substation bays.

In power system, information is received by intelligent electronic devices (IEDs) from the power apparatus (primary equipment) installed or/and from various sensors in the power system. The IEDs generate control commands that can maintain the system at normal operation.

In the following detailed description, reference is made to the accompanying drawings that form a part hereof, and which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

FIG. 1 shows a representation of a typical physical device such as an IED and a mechanism to represent the physical device in a manner that facilitates constructing its virtual model. The virtual model is referred to herein as the digital twin since the virtual model is configured to replicate the functional operation of the physical device (the IED) under all test scenarios.

Functionally, the physical device (IED) 100 can be represented as a system 110 that includes a Framework 135, Application function Engines 120, Services 130, and Communication Engine 125 as separate elements connected to the field over hardwired lines or over a bus. The framework 135 is defined as a collection of executable models that specify relevant functional aspects specific to the physical device (IED) 100. It formulates the structure and behaviour within a given application domain. The framework 135 also includes a configuration manager 150, a data model unit 140, and a diagnostic unit 145.

The configuration manager 150 can facilitate in configuring various interactions between the application modules that constitute the functional representations of the physical device 100. The configuration manager 150 could also help with such processes as setting the precedence order of function module execution, synchronous and asynchronous aspects of parameters and data passing between various dependent functions.

A data model unit 140 organizes different data elements of the device (IED) and standardizes how the data elements relate with one another. The data can be structured or unstructured. It can also be of any format, such as arbitrary binary data, text, JSON, or serialized protocol buffers. The data elements could have components such as internet protocol (IP) address and MAC address of the physical device (IEDs), specific technical configuration information of the device (such as interrupt request lines, input/output ports, etc.), tag and identifier information associated with the device, hardware, software, and firmware versions, device model and state information (such as health of the device, current operational state A diagnostic module 145 is a software component that facilitates monitoring various aspects of a device to provide system diagnostics. It can monitor parameters such as voltage, current, device internal temperature, etc.

The application function engine 120 is a component that facilitates building and running of application functions on the physical device or a computational unit embedded in the physical device. The various application functions enable performing device specific tasks such as a measurement of some parameter or control of an actuator etc. The communications engine 125 offers a platform for various connectivity options for data transfer among devices, between sensors and devices, between device and a gateway, between device and data management systems, etc. It enables using different network types such a wide area network (WAN), local area network (LAN), near-field communication (NFC) etc. and different communication protocols and standards such as Message Queuing Telemetry Transport (MQTT) etc.

The service modules 130 in the physical device can correspond to any of the service components such as error and failure diagnosis, health and performance monitoring, etc. The service module can integrate all the different service components to accomplish required service functions.

The above described functional representation of the physical device (IED) 100 forms a complete description of the physical device 100 in terms of its functional components. However, in order to implement the digital twin of the physical device either on an edge device or/and on a cloud computing system, the functional representation is often further simplified to alternate representations. Such alternate representation enable further consolidation of various functionalities within the functional representation, based on specific aspects of the physical device whose functionality needs to be implemented and studied in the digital twin.

One such alternate representation is depicted in FIG. 2a. The physical model representation could be simplified either by consolidation or elimination of modules. Such simplified representation could be optimized by detecting and removing redundant attributes or modules. This would completely describe a physical device for certain applications or the physical devices that do not require detailed representations.

Such a representation provides the devices as including a device model 235; a cognitive layer 230; the services module 220; and a training manager 240.

A device model 235 consists of the logical device that represents a functional view of the physical device. Functionally, it can be composed of units from framework that contains the data model unit, the diagnostic module, and the configuration manager.

The cognitive layer 230 includes components to make application functions adaptive, using for instance machine learning algorithms to improve them based on the data they process in their specific environments. The cognitive layer 230 also facilitates programming intelligent applications and modules that operate in real environments, and in virtual environments that are designed to simulate real environments.

Above the cognitive layer 230, is representation of the application function engine, the communication engine, and few select services 225.

Services module 220 forms the topmost layer of this logical representation. The service modules in the physical device can correspond to any of the service components such as error and failure diagnosis, health and performance monitoring, etc. The service module can integrate all the different service components to accomplish required service functions.

Training manager listens to (pre-processed) inputs and outputs and labels the samples for training leading to preparing probability tables or training result set. Labelling is done on the training manager at the edge/cloud.

As shown in FIG. 2b, the digital twin of the physical device (IED) 100 can be created on an edge device 210a or on a cloud computing system 210b. The communication between the physical device 100 and the digital twin on the edge device 210a can be accomplished through different communication protocols such as the Modbus TCP, IEC 61850 MMS (Manufacturing Message Specification), etc. Communication between the physical device 100 and the digital twin on the cloud computing system can be accomplished, for instance, via HTTP interface. Similarly, a communication between the digital twin on the edge device 210a and the digital twin on the cloud computing system 210b can be accomplished via HTTP interface.

The Configuration Data module 245 is provided to facilitate the IED digital twin to read and write all configuration and setting data of the corresponding physical IED It also enables viewing and setting IED parameters FIG. 3 shows a preferred embodiment of a representation of invention principles. The virtual model 215 of one more IEDs 320a, 320b are implemented on a cloud computing system 210b. Each IED has a corresponding digital twin 215 on the cloud computing system 210b. The IEDs 320a, 320b are configured to be in a bi-directional communication with their corresponding digital twins 215 as implemented on the cloud computing system 210b. The communication could be, for instance, via HTTP.

Each IED 320a, 320b could be part of a substation automation system where it provides an application function corresponding to an automation function comprising one or more of a protection, control and monitoring of the substation. The application functions of the IEDs 320a, 320n can correspond to automation of individual primary substation equipment 330a, 330n or to larger substation bays. The IEDs could either be existing IEDs 320a that are already commissioned and currently operational or they could also be new IEDs 320h that have been ordered or procured and need to be configured before getting commissioned for being operational for the substation automation.

In order to configure the IEDs 320a, 320b for specific application functions or to add application functions to the IEDs, it is first required to obtain or specifically recognise one or more application functions that needs to be configured on any given or identified IED The application functions can include automation functions such as protection, control and/or monitoring of the electrical equipment in a substation. These automation functions can be enabled through one or more processing on the analog or/and digital signals received by the IED The one or more processing could constitute harmonic detection, scheduling functions, specific waveform recording, etc. Such application functions enable generating configurations for the IEDs that facilitate adapting the IEDs for specific automation operation of electrical equipment in the substation.

The method for configuring the IEDs typically starts with the cloud computing system 210b receiving a request for generating at least one configuration for the at least one application function in the IED from a customer device 300, wherein the request comprises an identifier associated with the IED 320a, 320b.

The customer device 300 could be a workstation such as an operator workstation or an engineering workstation within the substation. The customer device 300 could also be a portable handheld device such as a smartphone that can communicatively be connected with the cloud computing system 210b.

The identifiers associated with the IEDs 320a, 320b could consist of the IED serial number, IED's IP address, IED's media access control (MAC) address, firmware and software version in the IED, model number, manufacturer name, etc.

From the identifiers associated with the IEDs 320a, 320b, the cloud computing system determines the IED as at least one of an existing IED 320a in the substation and a new IED 320b procured for the substation. This determination is done by comparing the identifier associated with the IED that needs to be configured with identifiers of IEDs stored in the computing system 215 for generating the at least one configuration. The identifiers and configurations of IEDs stored in the computing system 215 correspond to every existing IED commissioned in the substation automation. If the comparison does not reveal any identical identifiers from the stored identifiers, the cloud computing system accepts the identified IED as a new IED 320b that has been procured for commissioning within the substation. Similarly, if the comparison does reveal any identical identifiers from the stored identifiers, the cloud computing system accepts the identified IED as an existing IED 320a that is already commissioned within the substation and therefore the current configuration of this identified IED is correspondingly changed.

IEDs can be provided with customized or pre-configured application functions (such as protection, monitoring, control, metering, etc.) solutions for any type of primary substation equipment such as transformer, circuit breaker, etc. or/and for a substation bay.

Having identified the IED that need to be configured, the cloud computing system 215 adapts a virtual model 320at, 320bt for the IED by at least one of configuring a virtual model for the new IED as a digital twin to replicate functionalities of the new IED in the cloud computing system and using a pre-configured virtual model for the existing IED comprised in the computing system.

If the identified IED is one of the existing IEDs, the cloud computing system just adapts the virtual model of the existing IED that already exists and stored within the cloud computing system.

If the identified IED is one of the new IEDs, the cloud computing system first builds the virtual model of the new IED and stores this virtual model of the IED within the cloud computing system. The virtual model is built using standard programs and software environments such as digital simulators, relay modelling software, IED configurator software, etc. The cloud computing system can receive a vendor supplied IED capability description (ICD) file from the customer device 300. The ICD file provides the information needed by the cloud computing system to build the virtual model of the new IED. The information could consist of the number of the analog and digital channels, processing and storage capabilities, time synchronization methods such as internal clocks or/and GPS satellite clocks, etc.

Once the virtual model is built (for new IEDs 320b) or/and obtained (for existing IEDs 320a), the cloud computing system can now configure the virtual model for the IED as a digital twin to replicate functionalities of the new IED in the cloud computing system.

Further details on generating the IED configurations for specifically requested application functions is presented with reference to FIGS. 4 and 5.

FIG. 4 shows only the most relevant aspects of the alternate representation of physical device on the cloud computing system 210b. The invention provides with a software configuration tool 400 that is hosted typically on the customer device (300, FIG. 3). The software configuration tool 400 receives, from a user/customer, a request for one or more application functions to be implemented on the IEDs. The application functions could be, for instance, monitoring, control, or/and metering of specific primary equipment in the substation. The application functions could also include other functionalities such as measurement of harmonics, power factor, etc. The application functions can correspond either to new IED configurations or to additional functionalities added to a given configuration.

The software configuration tool 400 can generate the IED configurations through, for instance, using a graphical language method by sequentially organizing various function blocks (graphical elements) that together constitute the configuration. The configuration file can be uploaded to the cloud computing system 210b in various file formats such as the JSON file format 410. The function blocks correspond to specific functions such as functions involved in analog to digital conversion processes, pre-processing on the analog or digital data, processing on the data, etc. Pre-processing on the analog or digital data could involve functions for filtering (high pass, low pass, band pass, etc.) the data, improving the signal-to-noise ratio, obtaining any estimated parameters from measured data values using one more algorithms, etc. Processing on the data could involve performing various functions such as fast Fourier transform, discreet Fourier transforms, wavelet transforms, data dimensionality reduction, functions for generating control signals, etc.

The above mentioned graphical language method could use a sequence prediction technique, which could be a machine learning based model, to facilitate generating of the TED configurations. The sequence prediction technique can perform simulations that include performing a similarity search to check for existing configurations that are similar to the required TED configurations. Such similarity search enables the sequence prediction technique to learn about the sequence of functions that need to be arranged in specific order. In addition to determining the order of arrangement for the sequence of functions, the sequence prediction technique also facilitates connecting the signals that correspond to input and outputs of the functions. The sequence prediction techniques sequentially determine the connections between at least one input and at least one output of the one or more functions. This too is performed using the similarity search performed above where the sequence prediction techniques can learn the input-output signal connections from historically used/stored configurations.

The cloud computing system 210b is configured to accept the JSON file 410 from the software configuration tool 400 hosted on the customer device (300, FIG. 3). On the cloud computing system 210b, the Services module 220 contains the configuration function that processes this JSON file. The configuration function within the services module 220 generates the binary files of the corresponding JSON files and writes into the framework 135 via ftp.

An application function block library (AFL) execution engine then executes this binary file which is the TED configuration corresponding to the TED application function. Any errors, warnings, or status of the binary execution by the AFL execution engine is then communicated 420 back to the software configuration tool 400 hosted on the customer device (300, FIG. 3).

An alternate embodiment of the invention is represented in FIG. 5 where a virtual agent or virtual assistant (also referred to herein as a chatbot) 510 is provided as an interface between an engineer/customer 500 and the cloud computing system 210b that hosts the digital twin of the IED and enables generating the configurations that is uploaded to the IED to configure them for specific application functions.

The IED configurations can be generated in an automated method or they could be generated through guided-engineering. Both the automated configuration generation and the guided-engineering of the IED configurations is enabled through the cognitive layer 230 of the IED functional representation.

In continued reference to FIG. 5, an engineer/customer 500 starts by initiating a session with the virtual agent 510 where the virtual agent 510 could be hosted on any customer device (300, FIG. 3) and is configured to interact with the engineer/customer 500 through text and speech interface.

An engineer/customer can issue a voice command or a text command to the virtual agent 510. The command could be in the natural language of the engineer/customer 500. Nature of the command could involve sending information to the virtual agent 510 on specific application functions for an IED configuration.

The virtual agent 510 then converts any unstructured commands such as that obtained from natural language of engineer/customer to a structured format using standard algorithm implementations of natural language process and speech-to-text etc. The virtual agent 510 then sends this structured format command to the cloud computing system 210b. The cloud computing system 210b uses the cognitive layer module 230 of the IED digital twin to engineer the IED configurations corresponding to the specified application function for the IED. The engineering of the IED configurations can be performed in one of two ways—through an automated mechanism or through a guided-engineering mechanism.

In the guided engineering mechanism of generating the IED configurations, various tools that are part of the cognitive layer module 230c of the implemented digital twin of the IED, facilitate in building the configurations in a step-by-step manner using graphical elements referred to as function blocks. Aspects of the function block were described earlier in discussion with reference to FIG. 3.

FIG. 5 further shows few relevant functions 230a, 230b, 230c performed by few tools within the cognitive layer module 230. The tools within the cognitive layer module 230 could constitute of various artificial intelligence and machine learning based algorithms/models typically employed for time-series forecasting. Examples of such tools could be gradient boosting models, recurrent neural networks (RNNs) models, long short-term memory (LSTM) networks, and the like that can enable performing a time-series forecasting or sequential predictions based on the input/output data of previous times or sequences.

In FIG. 5, sequence forecasting ML algorithm on the cloud computing system 210b receives a command from the virtual agent 510.

The communication between the virtual agent 510 and the cloud computing system 210b could be through various web communication protocols such as the HTTP, HTTPS, etc.

The command could be to generate the IED configuration for enabling specific application functions such as monitoring, control, etc. of specific primary equipment or a substation bay. Once the command is received by the cloud computing system 210b, the cognitive layer module 230 on the cloud computing system 210b processes this command. The processing involves searching the database of previously saved or archived IED configurations that matches in similarity to the IED configuration for the received application function. This is represented by 230a in FIG. 5. Based on the similar configurations that the sequential forecasting machine learning algorithm finds, the sequential forecasting machine learning algorithm generates or recommends next. These are referred to as the machine learned configurations 230b. The machine learned configurations are then pushed to the virtual assistant 510 hosted on the customer device (300, FIG. 3) as recommended next steps 230c. Thus, sequence of functions are built through the process of recommended next steps till the objective of the application function is achieved. This sequence of functions then constitutes the IED configuration corresponding to the requested application function.

Further details on the specifics of the functions in the above described sequence of functions and their input/output configurations are provided in the discussion on the example application.

While the guided-engineering as described above is one mechanism for generating the IED configurations, the other mechanism is for automated generation of the IED configurations. In the automated generation of the IED configurations, the sequential forecasting machine learning algorithm first receives, in a structured format, the command for specific application function. The algorithm then searches for configuration similar to the requested application function. This is represented by 230a in FIG. 5.

Summarizing the process as developed, FIG. 6 shows the key steps in generating of the IED configurations.

As shown is step 600, in order to setup the digital twin of the IED on the cloud computing system, an estimate is first obtained on the cloud resources (processing and memory) needed to setup the digital twin and engineer the IED configurations. The estimation is performed by the software configuration tool hosted on the device interface. The estimation is obtained on the basis of the IED application functions that need to be configured and other configuration data of the IED. Various standard algorithms including supervised machine learning algorithms could be used for such resource estimation. The twin resources are estimated to consider the size of the device itself, additionally training manager and storage for training manager, the storage for more training data, the considerations of services to be made available on the twin instance compared to the device. For a feeder device this could roughly be 3.5 times device size considerations and 2 times processing power.

In step 610, an edge or a cloud computing system is then prepared using the resources of memory and processing power as estimated in step 610. Using available services (like RESTful on Azure) a twin instance (the virtual model) is created by using Web Interfaces directly from web based/other engineering tools such as the software configuration tool.

In step 620, the instance of the digital twin created in step 610 is deployed on the edge or/and the cloud computing system. That is, deploy the device model of the physical device (such as the IED) and services including the configuration services.

In step 630, the IED configuration is started. Some configurations are pre-learned in the system based on previous usage experience of functions in other devices. The Configuration Training manager listens to Configuration Manager and based on the new configuration saved, can immediately initiate next step In step 640, the cloud computing system starts search for next steps based on Machine Learnt trained repository—for instance, a Long Short Term Memory (LSTM) based Recurrent Neural Network that predict the next function block and connections between the function blocks. The Machine Learnt trained repository consists of one or sequence prediction techniques that can be used to further rank any generated predictions considering customer profile using Collaborative Filtering Algorithm.

In step 650 the sequence prediction technique provides the next steps to configure the IED. The prediction of sequence of functions can be based on functions as a network approach. The recommendations are provided as a sequence of predictions providing support for next three steps to users over a graphical user interface (GUI) of engineering or like conversational interfaces such as chatbots. The recommendations for the sequence of functions are based on user acceptance goes to next steps in engineering and keeps informing the system acceptance like computer processing unit (CPU) or, in general, processor load estimation to user over the interface.

An application of the above described invention is illustrated in FIGS. 7a and 7b. The detailing of the processes in FIGS. 7a and 7b is represented by the steps in FIG. 8. The description below of the example application of the invention will refer simultaneously to FIGS. 7a, 7b, and 8.

A request for an application function for the IED is first received from a customer 800. This request is received by the customer device (300, FIG. 3). The application function for an IED corresponds to a power system fault analysis and triggering a trip signal based on the fault analysis. The application function also involves sending GOOSE messages to other IEDs in the network about the status of a power system fault.

In order to generate an IED configuration corresponding to the received request for the application function, the customer device (300, FIG. 3) interfaces with the cloud computing system (210b, FIG. 3) to start generating the IED configurations. The cognitive layer model on the cloud computing system looks though the database of previously saved IED configurations to find all similar configurations (similarity search) that closely matches the required IED configuration. This is represented by 810 in FIG. 8. Furthermore, the cognitive layer model on the cloud computing system also checks for any previous configurations saved against the customer—that is, IED configurations historically used by the customer. This is represented by 820 in FIG. 8. This process of identifying the customer profile 820 and identifying similar IED configurations 810 is used for automated generation of the IED configurations or/and provide recommended steps in IED configuration generation against specific application functions for an IED.

Typically, the configuration begins with hardware channels followed by pre-processing and then main functions are added to configuration. The sequence of connections made from hardware channels to pre-processing and main functions will define the order of execution. The cycle of execution also depends on this sequence.

The configurations are generated using the sequential forecasting machine learning algorithm (sequence prediction technique) where the training happens in three ways—
  a. In terms of clustering to say if this is a sub-application, applying k-means clustering.
  b. In terms of probability of usage: the probability of how the functions and connections are historically made for various application functions, and
  c. In terms of sequencing: This is captured as an LSTM network.

Based on such information as obtained in steps 810 and 820, the sequence prediction algorithm generates a first function that involves processing analog currents. This is represented by 830 in FIG. 8. Here, since there are four current transformer channels, these channels come first—a residual current (Ir) 710a and the currents from the three phases of the power system I1 710b, I2 710c, and I3 710d. The function blocks that receive these inputs are the current transformer function blocks. Residual current (Ir) 710 goes as input to the current transformer function block RESTCTR 720. The current from the three phases of the power system I1 710b, I2 710c, and I3 710d are received by the current transformer function block ILTCTR 730. These function blocks can be configured to perform various processing on the received current including analog to digital conversion, root-mean square (RMS) estimation, harmonic analysis, etc. The TCTR functions therefore involve pre-processing.

The sequence prediction technique then checks again through the information gathered from 810 and 820 as described above and determines that the overcurrent functions should be added next and connected. The sequence prediction technique therefore add the next set of functions that are the three-phase non-directional overcurrent protection functions PHxPTOC 740a, 740b, 740c. Here, the overcurrent protection can correspond to the high stage (x=H) 740a, the low stage (x=L) 740b, and the instantaneous stage (x=I) 740c. The overcurrent function starts when the input current exceeds a set limit. The measured phase currents are compared phase-wise with the set limits for each phase. If the measured value exceeds the set limits for each phase, the overcurrent protection functions PHxPTOC 740a, 740b, 740c generate outputs to reflect the state of such exceeding current values.

Similarly, just as described above, the sequence prediction technique adds the earth fault protection function (EFxPTOC) 750a, 750b, 750c to take the input from the pre-processing performed by the residual current transformer function, RESTCTR 720.

The sequence prediction technique then checks again through the information gathered from 810 and 820 as described above and determines that output of the overcurrent functions should be connected to disturbance recorder with binary channel 760 and logic gates SR flip-flop 770. The output of PHHPTOC 740a is therefore connected as input to disturbance recorder with binary channel 760. The disturbance recorder function 760 is configured to record both analog signals and binary status signals. The conditions of starting the disturbance recorder function 760 can be automatically defined through a parameter setting in the function. The disturbance recorder function 760 continues recording the inputs for a pre-defined total recording time or till the time another condition is met. The outputs from the overcurrent protection functions PHHPTOC 740a and PHLPTOC 740b are connected as input to SR flip-flop for further logic evaluation.

The sequence prediction technique checks again through the information gathered from 810 and 820 as described above and determines that output of the earth fault overcurrent functions 750a, 750b, should be connected to logic AND gate 780.

In an exemplary embodiment, On Drag and Drop of ILTCTR. function the prediction returns for protection, Overcurrent Functions—PHHPTOC (High, High), PHLPTOC (High, Low). I3P of ILTCTR is connected to I3P of PHLPTOC. Based on customer profile and knowledge that earth fault is important, RESTCTR function is next and the EarthFault related Functions (EFHPTOC, EFLPTOC etc.) are returned by prediction and the IRES and blocks are connected. Considering the need based on customer profile to capture faults, A1RADR and B1RADR functions are added and so is connected to operate the functions like PHHPTOC (Overcurrent).

For time-critical event-based messages, the sequence prediction technique adds a function for transmitting Generic Object Oriented Substation Events (GOOSE) messages directly on the ethernet link layer. In order to convey state changes to another IED 790b, a GOOSERCV_BIN 790a is added. The datasets defined for GOOSE would include a default dataset.

Thus, the configuration for the requested application function is generated. If the IED is an existing IED within the substation, the configuration can be transmitted to enable the IED for performing the automation operation as defined by the configuration. If the IED is a new IED that has been procured, the configurations are stored in the cloud computing system and can be transmitted to the new IED when it is made available.

This written description uses examples to describe the subject matter herein, including the best mode, and to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for configuring an intelligent electronic device (IED) from a plurality of IEDs connected in a communication network of a substation with a computing system that is communicatively connected in the communication network of the substation for transmitting a configuration of at least one application function to the IED for operating one or more electrical equipment in the substation, the method comprises, the computing system:
   receiving a request for generating the configuration for the at least one application function in the IED from a customer device, wherein the request comprises an identifier associated with the IED;
   determining the IED as at least one of an existing IED in the substation and a new IED procured for the substation by comparing the identifier associated with the IED with identifiers of IEDs stored in the computing system for generating the at least one configuration;
   adapting a virtual model for the IED,
      i) by at least one of: initializing the virtual model for the new IED as a digital twin based on technical specification of the new IED, and selecting a virtual model that is previously initialized for the existing IED based on technical specification of the existing IED comprised in the computing system; and
      ii) selecting a first sequence of functions for the virtual model for providing at least one application function in the IED, wherein the first sequence of functions is selected from a database of functions provided in the computing system based on at least one of the technical specification of the new IED and the existing IED;
   performing simulation of the virtual model to generate the configuration for the IED and obtain a second sequence of functions, wherein the second sequence of functions is arranged in an order that is determined through simulation of one or more functions comprised in the first sequence of function and sequentially determining connections between at least one input and at least one output of the one or more functions, wherein a sequence prediction technique selects the second sequence of functions and length of the second sequence of functions using a similarity search technique performed by comparing the received request for generating the configuration with configurations of IEDs stored in a database of the computing system and previous configurations of IEDs stored in the database and associated with a customer profile associated with the request;
   transmitting the configuration for the at least one application function to the IED during commissioning of the IED enabling the IED to perform the automation operation corresponding to the application function.

2. A method as claimed in claim 1, wherein the first sequence of functions comprises a measurement function configured to generate measurement data, a pre-processing function operating on the measurement data, a processing function configured to operate on output of the pre-processing function, and a control function operating on the output of processing function.

3. A method as claimed in claim 1, wherein the second sequence of functions comprises an ordered arrangement of the functions, wherein the order of the arrangement of function is determined by a sequence prediction technique on a cloud computing system.

4. The method as claimed in claim 1, wherein performing the simulation of the virtual model to generate the configuration for the IED and obtain the second sequence of functions is based on using a machine learning based model executing a time-series forecasting or sequential predictions.

5. A system for configuring one or more IEDs connected to electrical equipment in the substation wherein the IEDs are communicatively connected with the system through a communication network of the substation, the system comprising:

one or more storage units for:
        storing a virtual model of existing IEDs in the substation; and
        storing methods for sequence prediction techniques, data for training the sequence prediction techniques, and methods for similarity search techniques;
    one or more processors to:
    initialize a virtual model of the IED identified for configuration; and
    perform simulation of the virtual model using the sequence prediction techniques and the similarity search techniques to generate the configuration of the IEDs and a sequence of functions that comprises at least one application function wherein the sequence prediction techniques selects the sequence of functions and length of the sequence of functions using the similarity search techniques performed by comparing a received request for generating the configuration for the at least one application function in the IED with configurations of IEDs stored in a database of the system and previous configurations of IEDs stored in the database and associated with a customer profile associated with the request; and
    a communication engine configured to:
        receive the request for generating the configuration for the at least one application function in the IED from a customer device; and
        transmit the generated configuration to the IED.

6. The system of claim 5, wherein the sequence prediction techniques comprises at least one machine learning program which when executed, generates the sequence of functions that comprises the application function for the one or more IEDs.

* * * * *